3,253,912
DISPERSION LEAD ALLOYS FOR BATTERY GRIDS
Joseph L. Rooney, Sylvania, and John P. Badger, Genoa, Ohio, assignors to The Electric Auto-Lite Company, Toledo, Ohio, a corporation of Ohio
No Drawing. Filed May 20, 1963, Ser. No. 281,776
3 Claims. (Cl. 75—166)

This invention relates to batteries, more particularly to the metallic constituents for use in the fabrication of grids for use in battery plates of lead-acid batteries.

The corrosion of grid alloys in lead-acid-batteries and the effect of alloying metals in the grid material used in battery plates on the self-discharge rate of the battery, have been major battery problems in the industry for many years. It has long been known that a pure lead grid would be very satisfactory in the fabrication of a grid for a battery plate, provided the grid did not expand and "grow" under the stresses induced by the electrochemical cycling of the battery. The growth of the grid under these conditions is a function of the tensile strength of the material used in the fabrication of the grid. Hence, if pure lead is used in the fabrication of the grid for the battery plate, its low tensile strength causes a high rate of growth in the grid under the electrochemical cycling mentioned before. For this reason, various alloying materials have been added to the grid alloys to increase their hardness and tensile strength to overcome this growth problem of the battery grids. Antimony has been one of the principal alloying elements for the purpose which has had the disadvantage that its use in the grid alloy materially increases the selfdischarge rate of the battery.

It has been discovered that if lead oxide in the form of a dispersion in a matrix of pure lead is compressed, and fabricated into a grid for battery plates from a powdered mixture of the two materials, a grid can be provided which has materially increased tensile strength and, therefore, is more resistant to the growth characteristic mentioned hereinbefore with reference to a grid made of pure lead when used for the fabrication of battery grids. The increased tensile strength of the dispersion alloy of lead oxide and pure lead provides a grid which is resistant to growth under electrochemical cycling in the battery. The dispersion lead alloy also has chemical and electrochemical properties which are very similar to those of pure lead in a lead-acid battery or lead base battery systems where metallic grid alloy structures are used to support active material of the battery plates.

The use of the dispersion lead alloys in lead-acid batteries has several advantages over the lead alloy systems utilizing antimony, in that the batteries utilizing these new alloys have very low corrosion rates, have very low self-discharge rates, and also cause very low contamination rate in the battery as compared to that caused by alloying metals (such as antimony) which react with the active materials in the lead acid cell to cause disruption of the normal relations of charge and discharge of the battery under various service conditions.

It is, therefore, a principal object of this invention to provide a grid alloy for use in plates of lead-acid batteries consisting essentially of lead which can be utilized in the fabrication of a lead-acid battery which has a very low corrosion rate and a very low self-discharge rate.

It is a further object of this invention to provide a dispersion alloy of lead oxide in a martix of pure lead which has superior physical characteristics such as high tensile strength and chemical inertness for the fabrication of grids for the manufacture of battery plates for use in a lead-acid battery which has a very low corrosion rate and a very low self-discharge rate.

Other objects and advantages of this invention relating to the arrangement, operation and function of the related elements of the structure, to various details of construction, to combinations of parts and to economies of manufacture will be apparent to those skilled in the art upon consideration of the following description and appended claims.

In the fabrication of grids for use in plates in lead-acid batteries, it is essential that a frictional material which is inert to the chemical action of the lead-acid battery be dispersed into the body of metallic lead from which the grid is made to improve the physical characteristics, particularly the tensile strength of the material by intercrystalline frictional effects between the crystals of pure lead, of which the grid matrix is fabricated. The method of incorporating this inert frictional material in the lead matrix can be accomplished in several ways, one of which is disclosed in Patent No. 3,085,319 of April 16, 1963 entitled "Sub-divided Lead Product." It is to be understood that the inert frictional materials can be added to the lead matrix in other ways such as adding them to a fused body of lead but generally it is preferable to combine the constituents of the dispersion alloy in powdered form which allows a more uniform dispersion of the inert frictional material in the matrix of pure lead.

The pure lead is sub-divided into very small particles, preferably all of which will pass through a 200 mesh screen which must be accomplished in an inert atmosphere such as nitrogen inasmuch as lead is very readily oxidized in the presence of air when in finely-divided state. The sub-division of the lead may be accomplished by the methods disclosed in the aforementioned patent, or it can be accomplished by spraying the molten lead by a blast of inert gas and collected in an atmosphere of inert gas. It is then passed over the 200 mesh screen to obtain that portion which will pass therethrough. The inert material which is as finely-divided as the lead and is to be dispersed in the particles of pure lead, is then added and thorolghly mixed in an inert atmosphere to provide an even dispersion of the inert frictional material through the main body which consists of the pure lead particles.

The mixture is then highly compressed at a pressure of at least one ton per square inch to provide a self-sustaining body consisting of a matrix of pure lead, having dispersed therein the inert frictional materials. The self-sustaining alloy dispersion is then fabricated into a grid by any convenient method such as punching or the like. If desired, the step of compressing the mixture of finely-divided particles of lead and the inert frictional materials and the formation o fthe grid can be accomplished in one step.

Thereafter, the grid is formed into a battery plate by positioning active materials thereon in the conventional manner. The pasted plates are thereafter dried and fabricated into battery elements in the usual manner.

The preferred frictional material which causes the intercrystalline friction between the particles of pure lead is preferably made of lead compound such as $PbO$, $PbO_2$, $Pb_3O_4$ and other lead compounds including the carbonates, sulphates and the like. These materials are also placed in finely-divided condition, preferably to pass through a 200 mesh screen before they are added to the particles of pure lead as described hereinbefore. The percentages of the frictional inert materials, which are to be added to the pure lead, varies, to a certain extent, depending upon the materials used, but in no case is the percentage to be more than 10 percent of the final body. Other materials than lead compounds have also been used to provide the frictional elements in the body of lead such as tungsten carbide and silicon carbide which are also added to the body in the manner already described.

Grids made for plates used in lead-acid batteries in this manner have advantages which are reflected in the service performance of the battery in which they are used. The grids in a lead-acid battery have very low corrosion rates and also substantially reduce the self-discharge rates of the lead-acid battery which result in batteries which have longer shelf life. The grids formed of this dispersion alloy of lead, reduce the contamination of the active materials of the cells to a very low degree inasmuch as the materials used in the dispersion alloy are selected to be inert to the chemical action of the battery and thus avoid the use of antimony and other deleterious materials which have more marked effect on the battery by causing contamination of the active materials of the plates.

During the manufacture of these dispersion alloys, by whatever method is feasible, materials may be used which could have a deleterious effect on the chemical action of the battery in any interim step of manufacture, provided, however, that in the final grid all trace of such material must be removed to avoid the deleterious action on the battery.

It is to be understood that the above detailed description of the present invention is intended to disclose an embodiment thereof to those skilled in the art, but that the invention is not to be construed as limited in its application since the invention is capable of being practice and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. A grid alloy for the fabrication of grids of battery plates in a lead-acid battery, consisting essentially of a dispersion alloy of lead and a frictional material innocuous to the chemical action of the battery which causes intercrystalline friction in the main body of the alloy, the frictional material being not more than 10% and selected from the group of $PbO$, $PbO_2$, $Pb_3O_4$, tungsten carbide, and silicon carbide with the balance substantially pure lead, said alloy having been prepared from material sufficient to pass through a 200 mesh screen, and then compressed together as a uniform mixture at a pressure of at least one ton per square inch to form a self-sustaining body from which the grid is fabricated.

2. The invention defined in claim 1 further characterized by fabricating the battery grid in its final form during the compression step.

3. The invention defined in claim 1 further characterized by providing a frictional material from lead carbonates or lead sulphates.

References Cited by the Examiner
UNITED STATES PATENTS

| | | | |
|---|---|---|---|
| 2,841,491 | 7/1958 | Zahn | 75—166 |
| 2,972,529 | 2/1961 | Alexander et al. | 75—.5 |
| 3,066,391 | 12/1962 | Vordahl | 29—182.5 |
| 3,085,876 | 4/1963 | Alexander et al. | 75—206 |
| 3,098,293 | 7/1963 | Ebdon | 29—528 |

DAVID L. RECK, *Primary Examiner.*

O. MARJAMA, *Assistant Examiner.*